(12) United States Patent
Davis et al.

(10) Patent No.: US 7,313,363 B2
(45) Date of Patent: Dec. 25, 2007

(54) ACTIVATION METHOD FOR WIRELESS COMMUNICATION SYSTEM

(75) Inventors: Robert Andrew Davis, Bolton, MA (US); Paul Joseph Gaudet, Dracut, MA (US); Tomasz Kazimierz Konopka, Chelsea, MA (US); Goran Zekanovich, Nashua, NH (US)

(73) Assignee: M/A-Com, Inc., Lowell, MA (US)

( * ) Notice: Subject to any disclaimer, the term of this patent is extended or adjusted under 35 U.S.C. 154(b) by 509 days.

(21) Appl. No.: 10/431,785

(22) Filed: May 8, 2003

(65) Prior Publication Data

US 2004/0224631 A1 Nov. 11, 2004

(51) Int. Cl.
H04B 7/15 (2006.01)

(52) U.S. Cl. .............................. 455/11.1; 455/7; 455/9; 370/315

(58) Field of Classification Search ........... 455/7–11.1; 370/315
See application file for complete search history.

(56) References Cited

U.S. PATENT DOCUMENTS

| | | | |
|---|---|---|---|
| 4,534,061 A | | 8/1985 | Ulug |
| 4,539,706 A | | 9/1985 | Mears et al. |
| 5,293,639 A | * | 3/1994 | Wilson et al. ................ 455/17 |
| 5,857,144 A | * | 1/1999 | Mangum et al. ........... 455/11.1 |
| 6,141,533 A | * | 10/2000 | Wilson et al. ............. 455/11.1 |
| 6,647,244 B1 | * | 11/2003 | Haymond et al. ......... 455/11.1 |
| 2002/0111137 A1 | | 8/2002 | Walkup |

FOREIGN PATENT DOCUMENTS

EP 1 202 472 A2 5/2002
WO WO 00/65863 11/2000

OTHER PUBLICATIONS

Frullone M et al: "Investigation on dynamic channel allocation strategies suitable for PRMA schemes" Proceedings of the International Symposium on Circuits and Systems. (ISCS). Chicago May 3-6, 1993, New York, IEEE, US. vol. vol. 2, May 3, 1993 pp. 2216-2219, XP010115580.
Written Opinion of the International Searching Authority, Applicant's or agent's file reference, 18000 PCT, International application No. PCT/US20040/014157, Date of mailing Oct. 11, 2004, International filing date Jul. 5, 2004., Applicant M/A-COM, Inc.

* cited by examiner

*Primary Examiner*—Edward F. Urban
*Assistant Examiner*—Raymond S. Dean (57) ABSTRACT

A method for determining an open or available channel from a plurality of predetermined channels for communication between a portable unit and a mobile repeater unit operating within the same wireless communication system. After an available channel has been selected, communication between the portable unit and the mobile repeater unit is established on the selected channel, and the selected channel is identified as active to all other portable units and mobile repeater units operating on the system.

7 Claims, 4 Drawing Sheets

ACTIVATION METHOD FOR WIRELESS COMMUNICATION SYSTEM

FIELD OF THE INVENTION

The present invention relates to wireless communication systems, and more specifically, to a method and apparatus for activation of repeater units cooperating with portable units within such a system.

BACKGROUND OF THE INVENTION

Wireless communication systems are commonly used by public service organizations, such as police, fire, and ambulance squads, and by private organizations, such as trucking companies, to provide a means to communicate with each other. Recently, developments in the wireless communication field have allowed systems to be created that can process both voice and data transmissions. An example of such a system is the OpenSky® System developed by M/A-COM, Inc. (Lowell, Mass.).

Systems in use today, such as OpenSky®, generally comprise at least one base station that communicates with one or more individual radios, consisting of mobile units or portable units. "Mobile units" are generally understood to be units that are located in a vehicle, while "portable units" are generally understood to be units that are hand carried by a user. Each base station is configured to transmit high power RF energy from an antenna, normally located at a significant height above ground. Each base station is also capable of receiving RF energy via an antenna. The base station communicates with individual radio units that are close enough geographically to transmit and receive an RF signal of a minimum required power level for successful communication.

Communication systems often comprise more than one base station. Each base station is linked to a central office using a land based or wireless system designed not to affect the communication system on which the base station operates. The central office performs various switching and routing functions that allow several base stations to operate together as a single wireless communication system.

In addition to one or more base stations, a plurality of mobile units and portable units can operate on a given system. Mobile units typically have more range than portable units, meaning that they can maintain effective communication at greater distances from the base station. The reason for this is that mobile units are fixed within a vehicle, thus, a battery carried by the vehicle powers them. A typical mobile unit can transmit RF signal at a power level of approximately 20 Watts. Much smaller batteries built into the radio devices, however, power portable units. As a result, they are limited in the amount of signal power at which they can transmit. A typical portable unit transmits RF signals at a power level of approximately 3 Watts. Thus, the range of a portable unit is significantly less than the range of a mobile unit.

In addition, portable units are often further limited by the user location. For example, a user can carry a portable unit into the basement of a building or other structure, which has the effect of further limiting the range of the unit. As a result, there are often areas where communication between the base station and the portable unit is degraded or lost completely.

One method that has been used to improve the communication range of portable units is using mobile repeater units. A mobile repeater unit is a unit that is permanently mounted in a vehicle that acts as a communications relay between the portable unit and the communication system As such, the mobile repeater unit acts as an intermediary between portable units and the base station. It receives information from the portable units over a "repeater channel" and forwards the information to the communication system over a "base channel" for a particular base station that is part of the communication system. Similarly, it receives information from the communication system via the base channel and relays it to the portable units over the repeater channel. By performing this function, mobile repeater units improve the coverage area in which portable units can operate efficiently. Portable units that are proximate to a mobile repeater unit but in an area beyond where their signal can reach the base station directly can communicate to the base station via relayed transmissions through the mobile repeater unit.

The mobile repeater unit is typically combined with a mobile radio unit, so a typical vehicle mounted mobile repeater unit allows a user in the vehicle to communicate directly with the base station while also functioning to relay communications from portable units located nearby. For the purposes of this discussion, the term "mobile repeater unit" shall hereinafter refer to mobile vehicle repeater units with mobile radio capabilities. Co-pending application Ser. No. 09/696,930 filed Oct. 25, 2000 further describes mobile repeater units operating within a wireless communication system, and is incorporated herein by reference.

One problem that exists on systems using mobile repeater units is that there is a need for the portable units and mobile repeater units to communicate on a common frequency or channel. Typically, the mobile repeater units and portable units will both be in possession of a list of repeater channels, but will not have any priority established about on which repeater channel to operate. Moreover, because mobile repeater units are by nature mobile, it is possible, and in fact probable, that more than one mobile repeater unit could be located within the transmission range of a portable unit. Since multiple mobile repeater units operating on the same channel in close proximity to each other could interfere with each other, and since repeater channels are a scarce resource that must be shared between a plurality of mobile repeaters and their associated portable units, it is desirable to assign the repeater channels in a manner that prevents interference and makes efficient use of the repeater channels. It is also desirable that a portable unit communicate with the mobile repeater unit that provides the best service in accordance with some useful criteria.

Furthermore, since the mobile repeater unit may be unattended and the user of the portable unit may be fully engaged in his primary mission, it is desirable that the mobile repeater unit and the portable unit establish communication automatically without any user input.

Therefore, it is desirable to have a means for a portable unit to automatically establish communication with one of a plurality of mobile repeater units and in so doing identify an operating channel that prevents other proximate mobile repeater units from operating on the same channel, while also providing the best service to the portable unit and making efficient use of available channel resources. The present invention fulfills these needs, among others.

SUMMARY OF THE INVENTION

The present invention provides an approach for determining an open or available channel from a plurality of predetermined channels for communication between a portable unit and a mobile repeater unit operating within the same wireless communication system. After an available channel has been selected, communication between the portable unit and the mobile repeater unit is established on the selected channel, and all other portable units and mobile repeater units operating in the area are able to determine that the selected channel is active.

A mobile repeater unit that is capable of operating on a select plurality of channels and is not in communication with a portable device (i.e., is "inactive") randomly selects a channel from the select plurality of channels. A portable unit in operation beyond the range of direct communication to the base station first searches the plurality of channels for a mobile repeater unit that is presently in communication with another portable unit (i.e., is "active"). If an active mobile repeater unit is found capable of providing adequate service, the portable unit connects to it. By doing so, any other mobile repeater units monitoring the same channel recognize that the channel is now occupied and randomly switch to a different channel.

A portable unit that is unable to locate a suitable active mobile repeater unit will then search for an inactive mobile repeater unit by querying channels that did not contain active mobile repeater units. An inactive mobile repeater unit monitoring a queried channel will respond to the query. The portable unit will select a mobile repeater unit from received responses to the query, and request connection. Other mobile repeater units that are monitoring this channel will detect the communication between the portable unit and the mobile repeater unit and switch to another channel to monitor. This prevents other mobile repeater units from attempting to operate on the same channel, which would result in interference.

Additionally, upon receipt of a request from a portable unit, the mobile repeater unit verifies the validity of the portable unit. That is, the mobile repeater unit checks the user identification number assigned to the portable device to determine if the portable device sending the request is part of the communication system. This assures communication only between authorized units within the communication system.

The channel identification and assignment approach in accordance with the present invention allows portable units to utilize mobile repeater units as portable base stations, thus expanding the coverage of the system, while eliminating the interference that previously occurred during such communication. Additionally, mobile repeater units are not limited to a single channel for communication with portable units, but can utilize a plurality of predetermined channels. This expands the amount of units that are capable of simultaneously operating on a system in the same geographic area. In addition, the method in accordance with the present invention causes active mobile repeater units to be selected when available, thus making efficient use of limited channel resources.

DETAILED DESCRIPTION OF THE INVENTION

The present invention provides an approach for determining an open or available channel from a plurality of predetermined channels for communication between a portable unit and a mobile repeater unit operating within the same wireless communication system. The apparatus and method involves both a mobile repeater unit and a portable unit. As such, the invention herein shall be described with respect to each unit.

Figure 1:
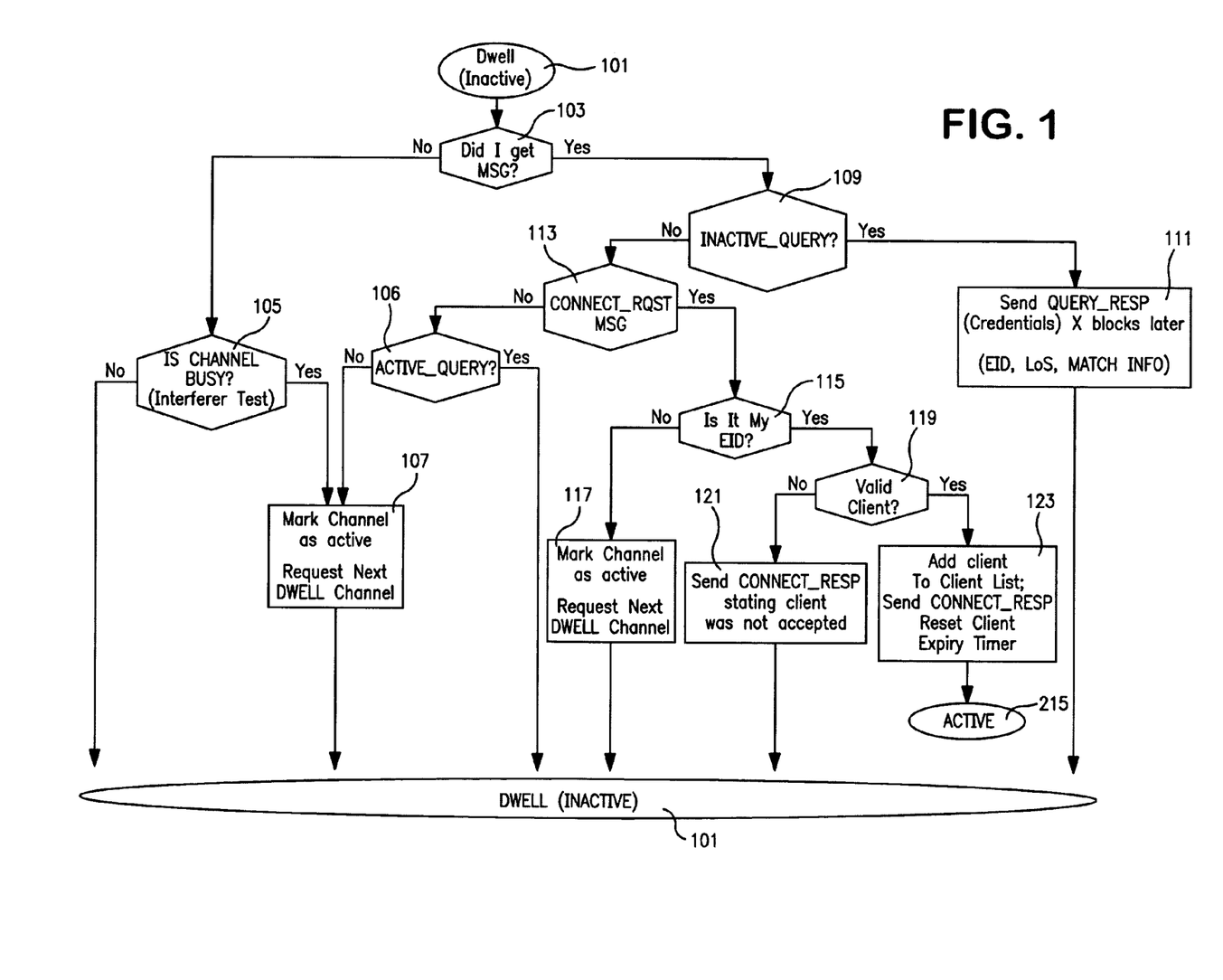
FIG. 1 is a flow chart illustrating the steps performed by a mobile repeater unit in the inactive mode.

A mobile repeater unit that is not communicating with a portable unit is referred to as an inactive mobile repeater unit. FIG. 1 illustrates the steps performed by a mobile repeater unit in the inactive state. Referring to FIG. 1, the mobile repeater unit in the inactive state resides in a dwell mode, or monitoring state (step 101). In this state, the inactive mobile repeater unit sequentially monitors a predetermined plurality of channels on which it is capable of communication with one or more portable units. The monitoring includes selecting a particular channel and performing a check to determine if any messages are received by the mobile repeater unit (step 103). If no message is received, the mobile repeater unit performs an interferer test to determine if the selected channel is in use (step 105). An interferer test is a check to determine if the selected channel is in use despite the fact that no identifiable message was received. For example, if a partial message was received, or noise similar to a message is present, the unit can determine that another mobile repeater unit is operating on this channel despite not having received a complete identifiable message. In such an event, the mobile repeater unit marks this channel as active (step 107) and randomly selects another channel from the plurality of predetermined channels, and the monitoring process is continued (step 101).

If no transmissions are detected on the channel, the mobile repeater unit continues to monitor the channel until the predetermined monitoring time has elapsed, at which point the mobile repeater unit randomly selects another channel and repeats the monitoring process.

If during a check for a message (step 103) a message is received, the mobile repeater unit must evaluate the message to determine the message type. The mobile repeater unit determines if the received message is an inactive query message (step 109). An inactive query message is a message sent by a portable unit whereby the portable unit is requesting any available mobile repeater units in the inactive state to respond. Should the message be determined to be an inactive query, a query response is sent by the mobile repeater unit (step 111). The query response identifies the mobile repeater unit as an available inactive unit. The mobile repeater unit sends its EID to be used by the portable unit in the connection process. The mobile repeater unit also sends a Level of Service (LoS) indicator to the portable radio. The LoS denotes the priority of a voice call initiated by a portable radio. If concurrent voice calls are initiated by more than one portable unit or by a portable unit and a mobile repeater unit, the voice call with the highest priority as indicated by the LoS will be sent to the network. The mobile repeater unit also sends the results of the User Identification Number (UID) of the portable unit compared against the permission masks stored in the mobile unit mask information, referred to as match information. In addition, the number of clients already connected to the mobile repeater unit is sent. The match information is used to determine if the portable radio is authorized to communicate using the particular mobile repeater unit. For example, it is desirable to separate transmissions between police officers from transmissions between firefighters. This can be accomplished by assigning different permission masks to the respective mobile repeater units. The information regarding the number of connected clients is used by the portable unit to determine which mobile repeater unit will be able to provide the best service. A mobile repeater unit with fewer portable units connected is preferable because the portable units all must share a finite amount of resources or capacity of the mobile repeater unit.

After sending a query response message to inform the portable unit of the mobile repeater unit's existence, the mobile repeater unit returns to the monitoring state (step 101) and waits for a subsequent communication from the portable unit.

If the message received is not an inactive query (step 109), a check is performed to determine if the message is a request to connect to the mobile repeater unit (step 113). If the message received is not an inactive query or a request to connect from the portable unit, the mobile repeater unit further checks to determine if the request is a query requesting an active mobile repeater unit (step 106). If the message received is none of these types, it is indicative of a transmission between a portable unit and another mobile repeater unit that have already established communication. Thus, the subject mobile repeater unit designates the particular channel as active, randomly selects another channel (step 107), and resumes the monitoring process (step 101).

If the message received is a query requesting an active mobile repeater unit (step 106), the subject mobile repeater unit ignores the request and continues to monitor the channel (step 101), because it is in the inactive state.

If the message received is a request to connect to a mobile repeater unit, the mobile repeater unit needs to determine if the request is intended for it, or for a different mobile repeater unit. A request for a connection sent by a portable unit will contain the equipment identification number (EID) of the mobile repeater unit to which it is attempting to connect. Once it is determined that the message is a connection request, the mobile repeater unit checks to see if the EID number sent in the request matches the EID number of the particular mobile repeater unit (step 115). In other words, a check is performed to determine if the portable unit is attempting to connect to this particular mobile repeater unit. If the EID numbers do not match (i.e., the portable unit is attempting to connect to a different mobile repeater unit), the mobile device recognizes that the channel on which it resides is in use by a different mobile repeater unit. Thus, the channel is marked as active (step 117), and the mobile repeater unit randomly selects another available channel and returns to the monitoring state (step 101).

If the EID number in the connection request matches the EID number of the mobile repeater unit, the mobile repeater unit realizes that the portable unit is attempting to connect to it. Before connection is allowed, the mobile repeater unit checks the UID of the portable unit against the permission mask and number of portable units already connected. The UID of the portable unit is included in a connection request and is used to determine if the portable unit should be allowed access to the system (step 119). If the portable unit is not a valid device (i.e., it does not have access to the system), a connection response is sent informing the portable unit that access has been denied (step 121). The mobile unit continues to monitor the channel (step 101) as it remains in the inactive state.

If the portable unit is a valid user, connection between the portable unit and the mobile repeater unit is established. Connection is established by sending a connection response from the mobile repeater unit to the portable unit to inform the portable unit of successful contact (step 123). The mobile repeater unit adds the portable unit to its client list, which is a register of portable units in active communication with the mobile repeater unit. The mobile repeater unit also keeps a timer associated with each portable unit with which it is actively communicating. The timer is referred to as the client expiry timer. If no communication is received from a particular portable unit for a predetermined period of time after connection is made, that particular portable unit will be removed from the client list.

Figure 2:
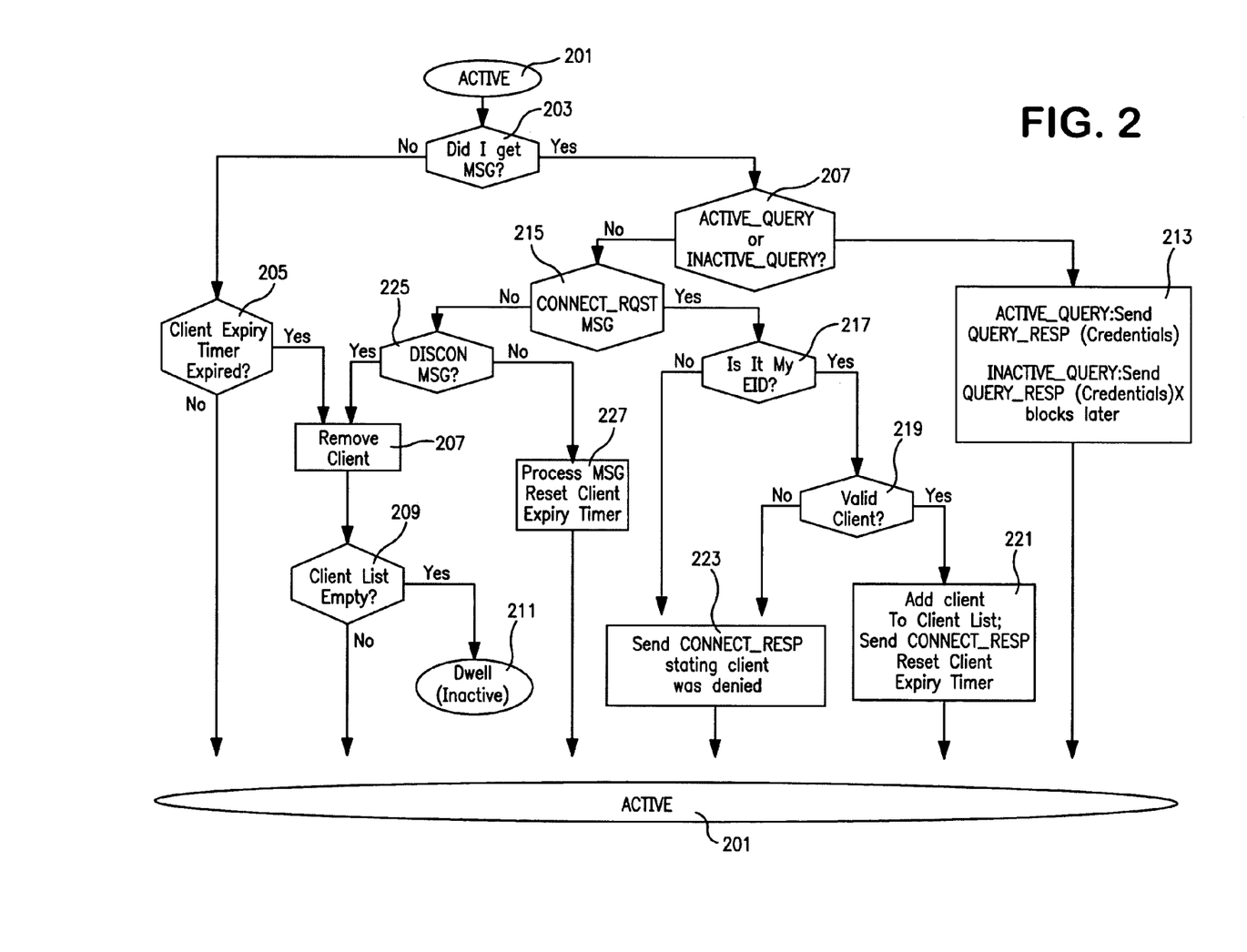
FIG. 2 is a flow chart illustrating the steps performed by a mobile repeater unit in the active mode.

Once communication with a portable unit has been established, the mobile repeater unit switches from inactive mode to active mode (step 125). FIG. 2 is a flow chart illustrating the steps in the channel activation process for a mobile repeater unit operating in the active mode. Referring to FIG. 2, an active mobile repeater unit monitors the channel on which it has become active (step 201), waiting for a message to be received (step 203). If no message is received during a predetermined period of time, the mobile repeater unit checks to see if the client expiry timer for any connected portable units has expired (step 205). If none of the timers associated with any connected devices has expired, the mobile repeater unit returns to the monitoring state whereby it monitors the active channel (step 201). If the client expiry timer for a particular connected portable unit has expired, that portable unit is removed from the client list (step 207). If the removed portable unit was the only portable unit in communication with the mobile repeater unit, the client list would become empty after its removal (step 209). When the mobile repeater unit is no longer in communication with a portable unit (i.e., the client list is empty), the mobile repeater unit returns to inactive mode (step 211) and functions as described above for mobile repeater units in the inactive mode.

If the client list is not empty (i.e., there are other portable units still in communication with the mobile repeater unit), the mobile repeater unit continues to monitor the active channel for messages (step 201). When a message is received, the mobile repeater unit checks to determine if it is either an active query or an inactive query (step 207). If it is one of those message types, the mobile repeater unit returns a query response message identifying itself to the portable unit (step 213) and waits for further messages.

If the received message is not an active query or an inactive query, it is checked to see if it is a connection request (step 215). If the received message is a connection request, the portable unit is attempting to connect to an active mobile repeater unit. The mobile repeater unit checks to see if the request contains its EID number, indicating that the portable unit is attempting to connect to it, as opposed to another mobile repeater unit (step 217). If the portable unit is attempting to connect to this particular mobile repeater unit, the mobile repeater unit also determines if the portable unit is a valid unit (step 219) by evaluating its UID against the permission mask. A check of the number of portable units connected is also performed. If it is a valid unit, and the number of units connected is not at the maximum allowable level, connection is permitted. The mobile repeater unit adds the portable unit to its client list, resets its client expiry timer to zero for this unit, and sends a connection response to the portable unit (step 221). If it is not a valid unit, the mobile repeater unit informs the portable unit that connection has been denied (step 223), and returns to the active mode (step 201).

If the message received is not an active query, inactive query, or connection request, the mobile repeater unit checks to see if it is a request to disconnect, or terminate the communication channel authorization (step 225). If the portable unit has requested disconnection, the mobile repeater unit removes it from the client list (step 207). Anytime a client is removed, the mobile repeater unit checks to see if the client list is empty (step 209) to determine if it should return to active mode or to inactive mode.

If the message received is intended for the mobile repeater unit, but is not one of the message types discussed above (active query, inactive query, connection request, disconnect request), it is not a message used for channel authorization. It is likely a communication message that is sent after the authorization is complete. As such, the mobile repeater unit processes the message by relaying it to the base station, or by sending it out to other portable units. Each time a message from a portable unit is processed, it is an indication that it is still in communication with the mobile repeater unit. Thus, the client expiry timer, which monitors how long a portable device has been inactive, is reset (step 227).

The portable units on the system operate simultaneously with the mobile repeater unit to effectuate channel authorization and connection. The portable unit can be programmed to search for an appropriate mobile repeater unit in at least three preferred ways, referred to herein as "best server" mode, "good server" mode, and "adequate server" mode. In "best server" mode, the portable unit scans all of the channels for both active and inactive mobile repeater units before selecting a channel. Particularly, the portable unit scans all channels and, once all available channels have been checked, selects the mobile repeater unit with the best quality parameters (i.e., with which the best communication can be achieved). In "good server" mode, the portable unit scans all of the channels for only active units and selects the highest quality active unit available. "Good server" mode provides an efficient use of resources by allowing the portable unit to communicate with an active mobile repeater unit on a channel that is already in use, as opposed to having to activate an inactive mobile repeater unit on a different channel. Only if no active mobile repeater unit is available does the portable unit then search for an available inactive unit, which will become active to facilitate communication between the portable unit and the base station or other portable units. "Adequate server" mode scans channels only until a suitable channel has been located, and then immediately attempts to connect to the suitable channel without scanning the remaining channels.

Figure 3:
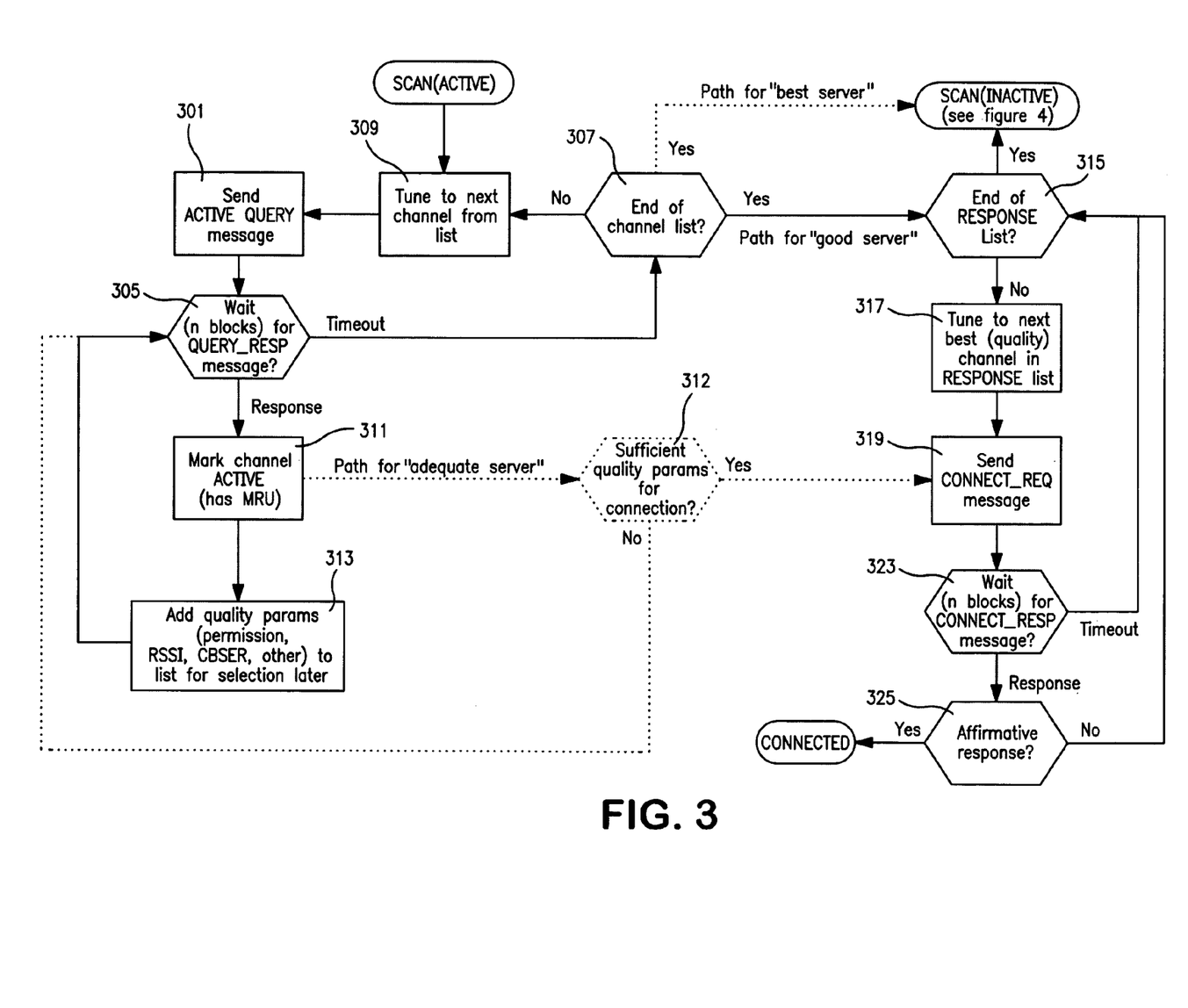
FIG. 3 is a flow chart illustrating the steps performed by a portable unit during an active scan.

FIG. 3 is a flow chart illustrating the steps performed by a portable unit in conducting a scan for a mobile repeater unit. The portable unit sends out a query message on a selected channel requesting any active units to respond (step 301). The portable unit then waits a predetermined time period for a response from any active mobile repeater units (step 305). If no response is received during the set time period, the portable device checks to see if additional channels exist on which to search for an active device (step 307). If additional channels remain, the portable unit advances to the next channel (step 309) and repeats the process.

If a response is received, indicating the presence of an active mobile repeater unit, the channel is marked as containing an active mobile repeater unit on the channel list maintained on the portable unit (step 311). The query response from the mobile repeater unit contains the information necessary to determine the quality of connection that could be achieved with this mobile repeater unit. Examples of such information on the OpenSky® system includes parameters such as Received Signal Strength Indicator (RSSI), Control Block Symbol Error Rate (CBSER), Level of Service, and the number of portable units already connected. Other embodiments can use other indicators of signal quality.

FIG. 3 illustrates the steps performed on each channel in both "good server" mode and "adequate server" mode, using two alternative paths out of box 311. The path for "adequate server" mode is shown using dashed lines. The flow in "best server" mode would be the same as that shown for "good server" mode, except that "best server" mode would perform the steps shown for "good server" mode in both FIG. 3 and FIG. 4 (scan for inactive mobile repeater units) on every channel before selecting a subsequent channel, rather than performing all of the steps of FIG. 3 on each channel before performing the any of the steps of FIG. 4.

Referring again to FIG. 3, if the portable unit is operating in "best server" or "good server" mode, the quality information for the selected channel is stored in memory on the portable unit (step 313). The portable unit will then continue to wait for additional responses from any other mobile repeater units (step 305). If no further responses are received, the portable unit will check to see if the end of the list of available channels has been reached (step 307) and, if not, repeat the process for all channels on which it is capable of operating to determine the highest quality active server available (step 317). In "best server" mode, the portable unit will also scan all available channels for an inactive server, as discussed below with reference to FIG. 4, before choosing a channel for operation. In "adequate server" mode, the portable unit evaluates the quality level of each response received from an active mobile repeater unit (step 312). The portable will attempt to communicate with a mobile repeater unit on the first channel that has quality parameters that appear adequate for communication. "Best server" mode has the advantage of allowing for the highest quality channel to be selected, but has the disadvantage of requiring the largest number of transmissions on all channels to perform the search. "Good server" mode requires fewer transmissions, thus conserving channel resources, but still requires a query on all channels. In areas with limited available channels and/or a large number of units on the system, channel resources can be conserved by operating in "adequate server" mode, which chooses a channel with fewer queries and will result in fewer mobile repeater units being activated at any given time.

In a preferred embodiment, the quality evaluation is made using a quality score. All of the quality parameters are assigned a certain value, and a mathematical computation is performed upon the parameters to create a quality score. If the quality score is greater than a minimum predetermined threshold, the mobile repeater unit is deemed adequate for connection, and would be chosen in "adequate server" mode. In "best server" or "good server" mode, the quality scores of all queried channels are compared and the channel with the highest score is chosen, provided that it meets the minimum predetermined quality threshold.

Once a channel has been selected using the "best server", "good server", or "adequate server" approach, the portable unit sends a request for connection to the mobile repeater unit on the selected channel (step 319). The connection request contains a unique identifier for the mobile repeater unit that was included in the query response to the portable unit. In this manner, the selected mobile repeater unit on the selected channel will respond to the connection request and any other mobile repeater units that were monitoring inactive on that same channel identify the channel as active and move to another randomly selected channel. The portable unit then waits a predetermined amount of time for a response (step 323). If an affirmative response is received (step 325) from the mobile repeater unit, connection is made and communication can occur. If no response is received or access is denied by the mobile repeater unit, the portable unit operating in "best server" or "good server" mode checks to see if another active unit responded to its initial query (step 315) and, if so, moves to the next highest quality channel (step 317) and repeats the process. The portable unit operating in "adequate server" mode continues to query the remaining channels (step 307). If no other active units are available, the portable unit seeks an inactive unit as described below and shown in FIG. 4.

Figure 4:
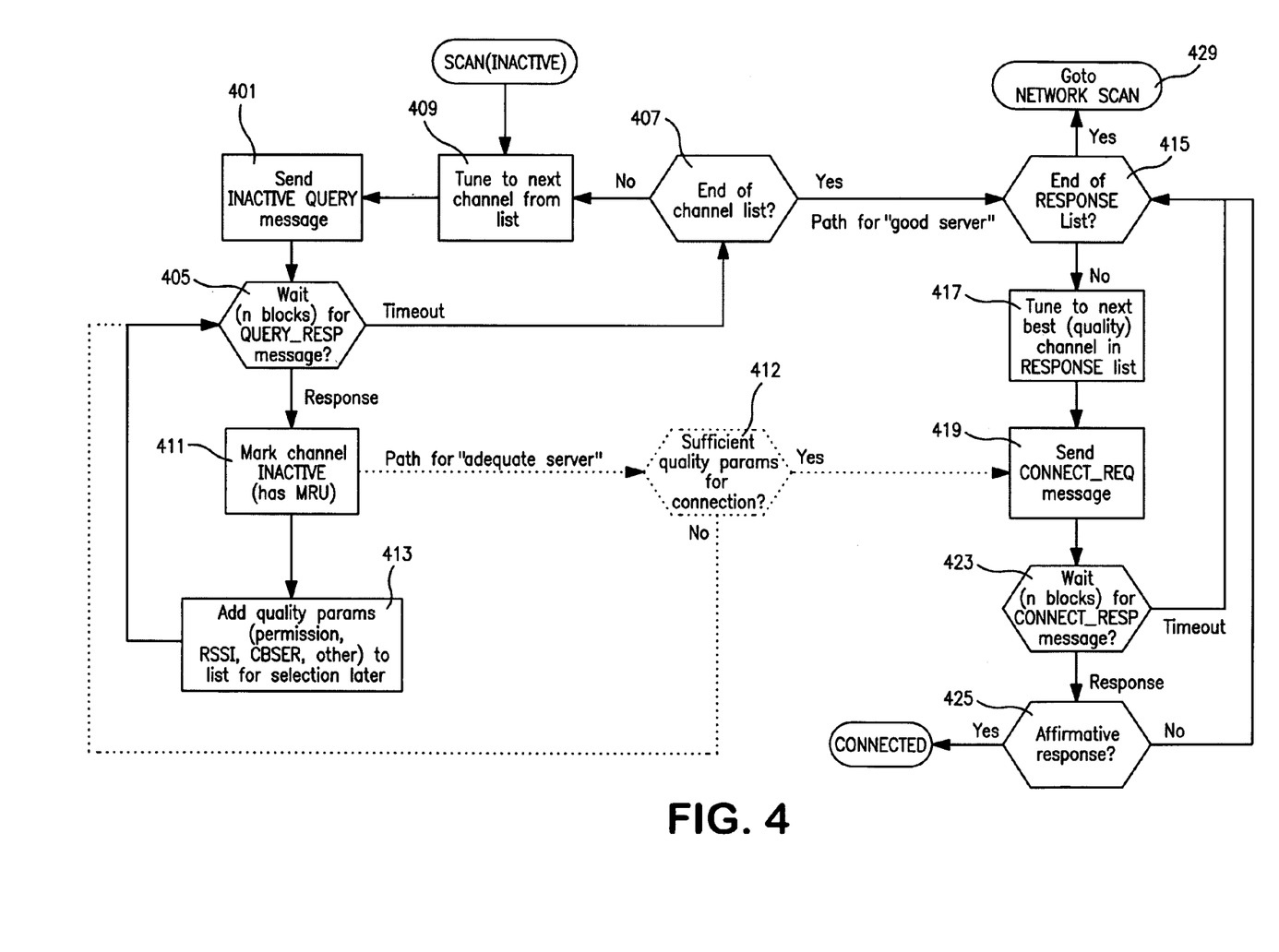
FIG. 4 is a flow chart illustrating the steps performed by a portable unit during an inactive scan.

The process of searching for an inactive mobile repeater unit is similar to the process of searching for an active unit with the exception that multiple inactive mobile units may be found on the same channel. A flow chart showing the inactive scan process is shown in FIG. 4. Referring to FIG. 4, a portable unit sends a query seeking an available inactive unit (step 401). The portable unit then waits a predetermined period of time for a response (step 405). If no response is received, the portable unit checks to see if additional channels remain that have not yet been queried (step 407), and, if so, advances to the next channel (step 409) and repeats the process.

If one or more responses are received while the portable unit is in "good server" mode, the channel is marked as active, i.e. has a mobile repeater unit operating on it, (step 411) and the quality parameters are stored along with a unique identifier provided by the mobile repeater unit (step 413), similar to the process used during an active scan. The process is then repeated until all available channels have been queried. In "adequate server" mode, the quality parameters are evaluated for sufficiency (step 412), and the portable unit will attempt to communicate with a mobile repeater unit on the first channel that has quality parameters that are adequate for communication without querying any further channels.

Once a channel has been selected using the "best server", "good server", or "adequate server" approach, the portable unit sends a request for connection to the mobile repeater unit on the selected channel (step 419). The portable unit then waits a predetermined amount of time for a response (step 423). If an affirmative response is received from the mobile repeater unit (step 425), connection is made and communication can occur. If no response is received, or access is denied by the mobile repeater unit, the portable unit operating in "best server" or "good server" mode checks to see if another inactive unit responded to its initial query (step 415) and, if so, moves to the next highest quality channel (step 417) and repeats the process. The portable unit operating in "adequate server" mode continues to query the remaining channels (step 407).

If no active or inactive units are available, the portable unit scans the network for an available base station, and if it fails to find a base station, it will begin scanning for mobile repeater units again (step 429). The portable unit will always prefer to be attached directly to the base station, if feasible.

Using an approach in accordance with the present invention for determining an open or available channel from a plurality of predetermined channels for communication between a portable unit and a mobile repeater unit operating within the same wireless communication system provides an efficient means of establishing communication between the portable unit and the mobile repeater unit, thus improving the quality of communication available to those using portable units in areas remote from the fixed base station. It allows for the connection to be made on a channel with sufficient quality parameters to create adequate communication, while conserving limited channel resources.

It should be understood that the foregoing description is illustrative and not limiting and that obvious modifications may be made by those skilled in the art without departing from the spirit of the invention. Accordingly, the specification is intended to cover such alternatives, modifications, and equivalents as may be included within the spirit and scope of the invention as defined in the following claims.

What is claimed is:

1. A method for a portable unit to communicate within a wireless communication system comprising at least one base station, at least one mobile repeater unit, and multiple portable units, comprising the steps of:
   a. selecting a channel from a plurality of transmission channels;
   b. transmitting a first query on said selected channel, said first query requesting responses from only mobile repeater units that are in active communication with another portable unit;
   c. monitoring said selected channel for a predetermined period of time for a response to said first query;
   d. if no response is received after said predetermined period of time elapses, selecting another of said plurality of channels;
   e. if a response from a mobile repeater unit is received on said selected channel,
      e.a. marking said selected channel as active;
      e.b. storing quality parameters associated with said selected channel;
   f. repeating steps a, b, c, d, and e for all remaining channels of said plurality of channels;
   g. selecting the channel with the highest quality parameters;
   h. sending a connection request to said channel with the highest quality parameters;
   i. if a response to said connection request from a mobile repeater unit is received on said selected channel, determining if said one of said plurality of transmission channels is available for communication between said at least one portable unit and said at least one mobile repeater unit; and
   j. if said one of said transmission channels is available, establishing communication between said portable unit and said responding mobile repeater unit on said one of said plurality of transmission channels and identifying said one of said plurality of transmission channels as active.

2. The method as set forth in claim 1 further comprising the step of:
   k. if said channel selected in step g returns a negative response, repeating steps h and i for the next highest quality channel.

3. A method as set forth in claim 2 further comprising the steps of:
   l. if no active mobile repeater unit responds to said first query;
      l.a. selecting a channel from said plurality of transmission channels;
      l.b. transmitting a second query on said selected channel, said second query requesting responses from only inactive mobile repeater units on said selected channel;

l.c. monitoring said selected channel for a predetermined period of time for a response;

l.d. if no response to said second query is received after said predetermined period of time elapses, selecting another channel from said list of channels; and l.e. if a response from a mobile repeater unit to said second query is received on selected channel, sending a connection request to said mobile repeater unit.

4. A method as set forth in claim 3, wherein step l.e comprises the steps of:

l.e.a. marking said selected channel as containing an inactive mobile repeater unit;

l.e.b. storing quality parameters associated with said selected channel;

l.e.c. repeating steps e.a, e.b, f, and g for all remaining channels of said plurality of channels;

l.e.d. selecting the channel with the highest quality parameters; and l.e.e. sending a connection request to said channel with the highest quality parameters.

5. A method as set forth in claim 4 wherein step l further comprises the steps of:

l.f. if said channel selected in step l.e.d returns an affirmative response, connecting to said channel; and l.g. if said channel selected in step i l.e.d returns a negative response, repeating steps i l.d and l.e for the next highest quality channel.

6. A method of communication within a wireless communication system comprising at least one base station, at least one mobile repeater unit, and at least one portable unit, comprising the steps of:

a. selecting a channel from said plurality of transmission channels;

b. transmitting a first request on said selected channel, said first request requesting responses from only mobile repeater units "that are in active communication with another portable unit";

c. monitoring said selected channel for a predetermined period of time for a response to said first request;

d. if no response to said first request is received after said predetermined period of time elapses, selecting another channel from said list of channels; and e. if a response from a mobile repeater unit to said first request is received on said selected channel, marking said selected channel as active;

f. if a response to said first request is received from a mobile repeater unit on said selected channel, storing quality parameters associated with said selected channel;

g. repeating steps a, b, c, d, e, and f for all remaining channels on said predetermined list of channels;

h. selecting the channel with the highest quality parameters; and i. sending a connection request to said channel with the highest quality parameters;

j. if said channel selected in step h returns an affirmative response, connecting to said channel;

k. if said channel selected in step h returns a negative response, k.a. selecting a channel from said plurality of transmission channels;

k.b. transmitting a second request on said selected channel, said second request seeking response from only mobile repeater units "that are not in active communication with another portable unit";

k.c. monitoring said selected channel for a predetermined period of time for a response to said second request;

k.d. if no response to said second request is received after said predetermined period of time elapses, selecting another channel from said list of channels; and k.e. if a response to said second request is received from a mobile repeater unit on said selected channel, marking said selected channel as containing an inactive mobile repeater unit;

k.f. if a response from a mobile repeater unit to said second request is received on said selected channel, storing quality parameters associated with said selected channel;

k.g. repeating steps k.a, k.b, k.c, k.d, k.e, and k.f, for all remaining channels;

k.h. selecting the channel with the highest quality parameters; and k.i. sending a connection request to said channel with the highest quality parameters;

7. The method as set forth in claim 6 further comprising the steps of:

l. if said channel selected in step k.h returns an affirmative response, connecting to said channel; and m. if said channel selected in step k.h returns a negative response, repeating steps k.h and k.i for the next highest quality channel.

* * * * *